Oct. 9, 1934.   J. WEINBERGER   1,976,379
REPRODUCTION OF SOUND PICTURES
Filed Nov. 30, 1931
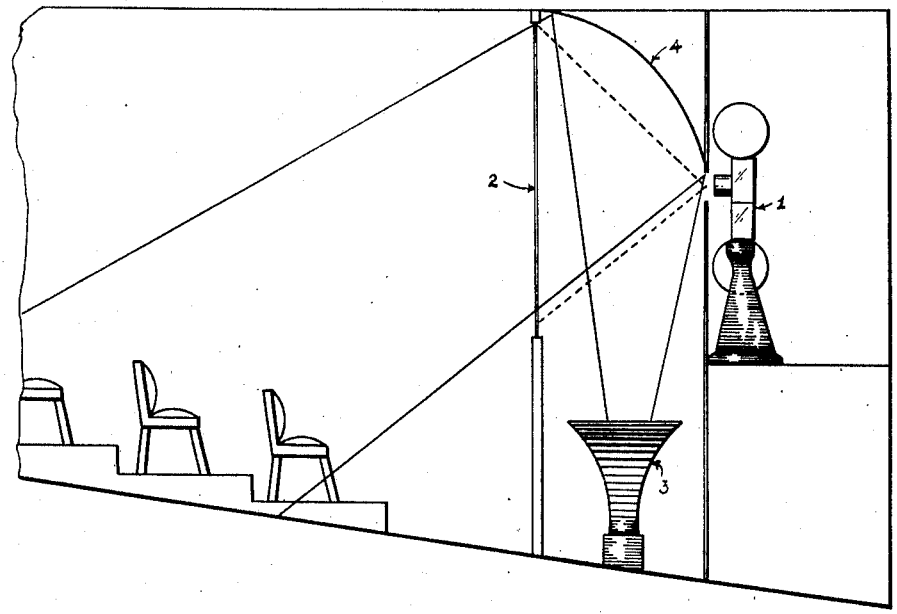
INVENTOR
JULIUS WEINBERGER
BY
ATTORNEY Patented Oct. 9, 1934

1,976,379

UNITED STATES PATENT OFFICE 1,976,379

REPRODUCTION OF SOUND PICTURES

Julius Weinberger, New York, N. Y., assignor to Radio Corporation of America, a corporation of Delaware Application November 30, 1931, Serial No. 577,943

1 Claim. (Cl. 88—16.2)

This invention relates to the reproduction of sound pictures and has for its principal object the provision of an improved arrangement whereby the reproduced sound is better distributed throughout the theatre in which the pictures are exhibited. A further object is the provision of an improved acoustical apparatus which permits proper distribution of the sound in a small theatre where the picture screen is of necessity located near the ceiling. A further object is the provision of an improved acoustical apparatus for use in connection with moving pictures projected on the rear of a translucent screen.

In small theatres having a seating capacity of less than one-thousand it is customary to project the picture on the rear of a translucent screen. This arrangement has the advantage that the space occupied by the picture projecting and sound reproducing apparatus is reduced to a minimum. In such theatres the screen is necessarily located near the ceiling and difficulty has been encountered in securing the proper distribution of sound throughout the theatre. It is of course necessary that the acoustical apparatus be kept out of the cone of light extending between the projector and screen. It has been proposed to mount the loud speaker or sound reproducer below or to one side of the screen. This arrangement has the disadvantage that sound is transferred directly to the front row of seats and does not pass over the audience and the loss of the higher frequencies is excessive as the sound proceeds from the front to the rear of the theatre.

In accordance with the present invention these disadvantages are avoided by an improved rear screen projecting apparatus including a loud speaker and reflecting surface so arranged with respect to one another as to ensure the proper distribution of sound. The invention will be better understood from the following description when considered in connection with the accompanying drawing and its scope will be pointed out in the appended claim.

The single figure of the drawing is a diagrammatic sectional view of a theatre wherein the invention has been embodied.

It will be noted that the apparatus includes a projector 1 from which pictures are projected on the rear of a translucent screen 2 located at the front and near the ceiling of the auditorium. A loud speaker 3 mounted below the screen 2 is so arranged that the sound which it emits is reflected into the auditorium from a reflector 4 mounted at the top and to the rear of the screen 2. As will be readily understood by those skilled in the art the reflector 4 may be easily arranged to distribute the sound in the auditorium.

When the reflector is located behind the screen it is desirable, although not necessary, that the screen be perforated. If the screen is not perforated it is desirable to perforate the frame or wall adjacent to the screen so as to permit passage of the high frequency sounds. It will be apparent that the improved arrangement has the advantage that the sound is properly distributed without the use of more space than that required for the proper projection of the picture. This advantage is of great importance in small theatres where the seating capacity may not exceed one-hundred and fifty seats.

Having thus described my invention, what I claim is:

In combination, a translucent sound pervious screen, a projector arranged to project moving pictures on the rear of said screen, a sound reflector mounted to the rear of said screen for directing sound therethrough and a sound reproducer mounted in co-operative relation to said reflector and out of the cone of light extending between said projector and said screen to project sound by reflection throughout the auditorium the said reflector being mounted in such relation to said screen and projector as to prevent interference thereby with pictures projected on said screen by said projector.

JULIUS WEINBERGER.